United States Patent
Steinke et al.

(10) Patent No.: US 6,974,519 B2
(45) Date of Patent: Dec. 13, 2005

(54) TIRE CORE PACKAGE FOR USE IN MANUFACTURING A TIRE WITH BELTS, PLIES AND BEADS AND PROCESS OF TIRE MANUFACTURE

(75) Inventors: Richard A. Steinke, Boulder City, NV (US); James G. Moore, Boulder City, NV (US); Manual Chacon, Henderson, NV (US)

(73) Assignee: Amerityre, Boulder City, NV (US)

(*) Notice: Subject to any disclaimer, the term of this patent is extended or adjusted under 35 U.S.C. 154(b) by 173 days.

(21) Appl. No.: 10/143,678

(22) Filed: May 13, 2002

(65) Prior Publication Data
US 2003/0209309 A1    Nov. 13, 2003

(51) Int. Cl.$^7$ ............................................. B29D 30/08
(52) U.S. Cl. ...................... 156/130; 152/452; 156/125; 156/130.7; 156/133; 264/311; 264/328.3
(58) Field of Search .................. 156/125, 128.1, 156/130, 130.7, 131, 133, 177, 179, 906, 156/306.6, 394.1, 406.4, 907; 264/311, 315, 264/328.3; 152/452

(56) References Cited

U.S. PATENT DOCUMENTS

| | | | |
|---|---|---|---|
| 464,767 A | 12/1891 | Woodward | |
| 612,583 A | 10/1898 | Davidson | |
| 1,014,318 A | 1/1912 | Merriman | |
| 1,255,000 A * | 1/1918 | Fergusson | 152/548 |
| 1,321,223 A * | 11/1919 | Marquette | 156/179 |
| 1,340,339 A * | 5/1920 | Hill | 152/549 |
| 2,476,884 A * | 7/1949 | Maynard | 425/582 |
| 2,873,790 A * | 2/1959 | Cadwell et al. | 156/125 |
| 3,948,303 A | 4/1976 | Patrick | 152/327 |
| 4,123,496 A | 10/1978 | Gallizia et al. | 264/328 |
| 4,199,315 A | 4/1980 | Gallizia et al. | 425/572 |
| 4,231,410 A | 11/1980 | Vannan, Jr. | 152/452 |
| 4,387,070 A | 6/1983 | Cunard et al. | 264/247 |
| 4,476,908 A * | 10/1984 | Cesar et al. | 152/452 |
| 4,855,096 A | 8/1989 | Panaroni | 264/45.5 |
| 4,943,223 A | 7/1990 | Panaroni | 425/116 |
| 5,524,913 A | 6/1996 | Kulbeck | 280/11.22 |
| 6,165,397 A | 12/2000 | Panaroni et al. | 264/45.5 |

FOREIGN PATENT DOCUMENTS

| | | | |
|---|---|---|---|
| GB | 2367 | | 6/1878 |
| GB | 1246471 | * | 9/1971 |

* cited by examiner

Primary Examiner—Geoffrey L. Knable
(74) Attorney, Agent, or Firm—M. Reid Russell

(57) ABSTRACT

A system for manufacturing an elastomeric tire utilizing a separate formation of a package having a tire core shape and containing tire belts, plies and beads. The package is formed by a laying up of layers of pre-cure elastomer intradigitated with sections of porous fabric, where the fabric fibers are placed at desired crossing angles to one another, and the pre-cure elastomer layers are positioned therebetween as a sandwich, with the sandwich then cold rolled into the tire core shape. Inelastic hoop shaped beads are fitted to and encapsulated in the tire core side walls ends and, as required, an inelastic belt is fitted around the tire core tread area that is secured thereto as by cold rolling a layer of pre-cure elastomer thereover, completing the tire core package. The tire core package is fitted into a mold, preferably a spin casting mold, and is supported therein equidistant from the mold cavity walls to receive an elastomer sprayed therein as the mold is spun. During spinning, the exothermic heat of reaction of the sprayed elastomer constituents as is generated as they are mixed and sprayed into the mold, completes the cure of the pre-cure elastomer, providing a homogenous finished tire with the belts, plies and beads optimally positioned therein.

8 Claims, 14 Drawing Sheets

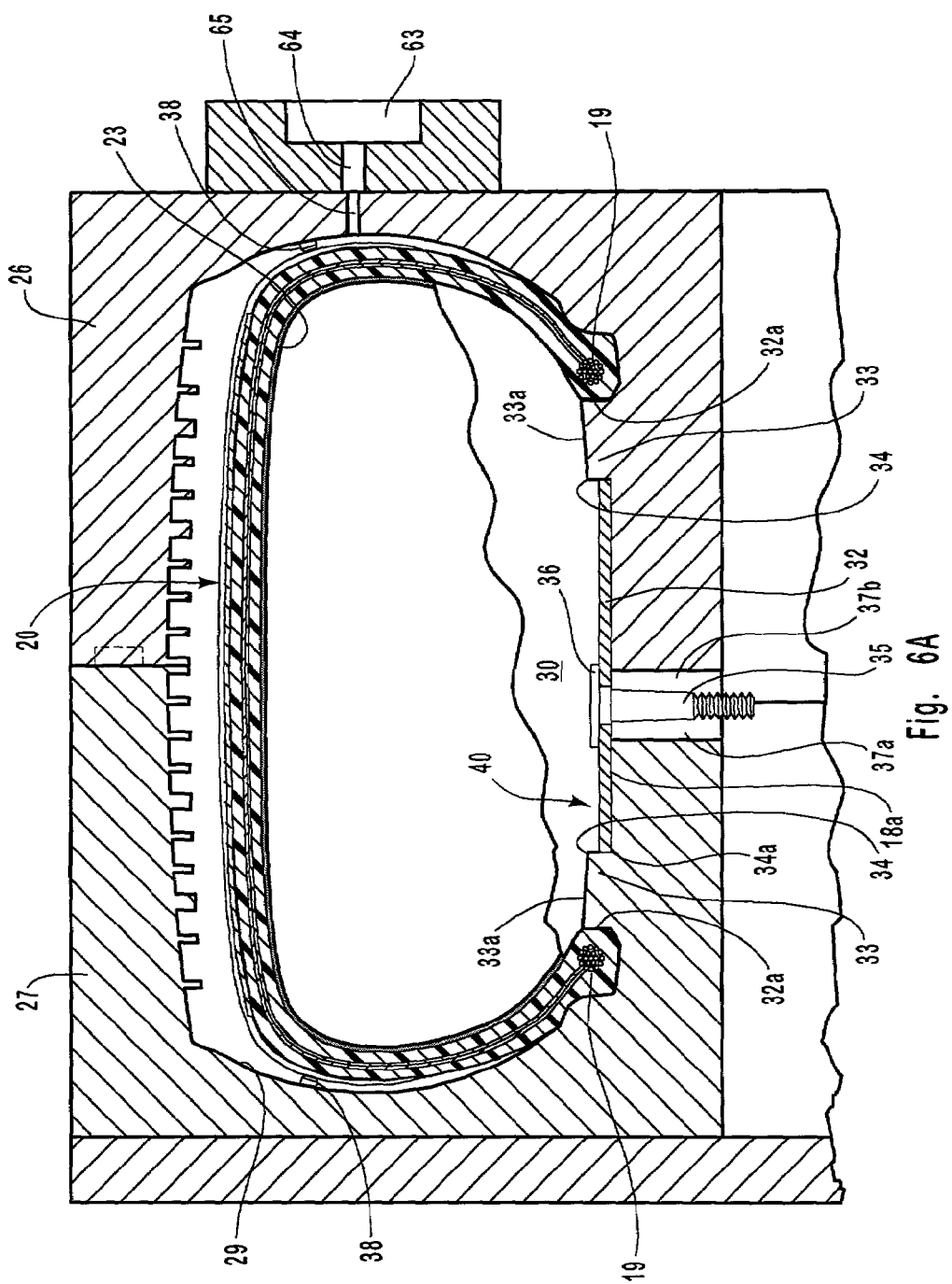

TIRE CORE PACKAGE FOR USE IN MANUFACTURING A TIRE WITH BELTS, PLIES AND BEADS AND PROCESS OF TIRE MANUFACTURE

BACKGROUND OF INVENTION

1. Field of The Invention

This invention pertains to methods for manufacturing tires containing belts, plies and beads that are for mounting onto a rim as a component of a wheel and in particular to a manufacture of an elastomer tire by injection molding methods where belts, plies and beads as are to be contained within the finished tire are formed into a package and positioned in the mold to receive the elastomer sprayed therein.

2. Prior Art

The present invention is in a new and unique automated process for the manufacture of an elastomer tire where belts, plies and beads, as are to be encapsulated in a tire core. The belts, plies and beads are maintained in a package of the belts, plies and beads encapsulated in a pre-cure elastomer that is formed to have a hardness or derometer rated that allows it to be rolled into thin flat sections, and the package is for fitting in a mold to receive a flow of an elastomeric material therearound. The elastomeric material flow consists of component chemicals that are combined and react, providing an exothermic reaction generating heat to cure the pre-cure elastomer of the package, forming a finished tire. A utilization of the invention in forming an elastomer tire thereby converts what has largely been a hands on skilled labor intensive process, into an automated process that can be performed by even entry level workers. Where, heretofore in earlier tire forming processes, workers sequentially positioned, and bonded together with adhesives, layers of green rubber and fabric around a mandrel, building a tire from the inside out. Which process includes encapsulating beads in the wide wall ends, with the assembly then cooked or vulcanized, under heat and pressure, in a mold, forming a tire. Unique to the invention is a formation of a package of belts plies and beads, and their positioning in a mold to receive a flow of elastomer directed therearound, with for a use of a pre-cured elastomer, the exothermic heat of reaction of the combined chemical that form the elastomer provides for a final curing of the pre-cured elastomer. In forming the package, the pre-cure elastomer sections are laid up over sections of fabric that are positioned at desired crossing angles, forming a sandwich that will become a tire core of belts and plies. The sandwich is then passed between at least one pair of cold rollers that press the sandwich of sections together. Thereafter, the sandwich is shaped by sequential travel through contoured cold rollers to form it to a shape of a tire core, and beads are then fitted to ends of the sandwich opposite sides, with the end edges then rolled therearound, completing the package of belts, plies and beads encapsulated in the pre-cured elastomer. The package is for positioned in a mold to receive an elastomer injected or other wise passed into the mold, flowing therearound and encapsulating the package. Which molding process is preferably a spin casting process where the elastomer components are sprayed into the mold and react together. Heat is produced in an exothermic reaction provided by the elastomer components mixing that reacts with the packaging material, completing the cure of the pre-cure elastomer.

While simple in concept, the process of the invention constitutes a major improvement to the tire industry, with the materials used in tire construction being significantly cheaper than those presently in use and as the process allows for automation of what has formerly been a hand labor intensive process, providing a significant savings in labor costs. Elastomeric solid, pneumatic and non-pneumatic tires have been manufactured for many years as solid rubber tires, with and without cavities, from as early as 1878. For example, a British Patent No. 2,367, shows a solid rubber tire and rim. Also, rubber tires having inner cavities are shown in U.S. Pat. No.'s 450,816; 464,767 and 612,583. Further, a U.S. Pat. No. 1,014,318 shows, in FIG. 1, a solid rubber tire having a center cavity that provides for maintaining the tire between hook ends of a rim. Similarly, tires with cavities are shown included with wheels of U.S. Pat. Nos. 3,948,303 and 5,524,913, that are directed to tire mountings to a rim, and there is no discussion in either patent of a tire manufacturing processes.

Examples of processes for manufacture of solid non-pneumatic tires by spin casting methods that do not involve a packaging of belts, plies and beads are shown in earlier U.S. Pat. Nos. 4,855,096 and 4,943,323 and in U.S. Pat. Nos. 5,906,836 and 6,165,397 that were co-invented by one of the present inventors. Also, an example of a process and apparatus for manufacturing pneumatic tires by spin casting methods are set out in U.S. Pat. Nos. 4,123,496 and 4,199,315, and processes for encapsulating a plastic reinforcing member as part of a wheel and as a ply within a tire formed by injection molding methods are set out in a U.S. Pat. Nos. 4,231,410 and 4,387,070.

None of the above set out patents, however, teach a formation, in a cold rolling process, of a single package. The present process provides, in a cold rolling process, utilizing a pre-cured elastomer, a package wherein are fixed belts, plies and beads for installation into a mold that is to receives an injection of an elastomeric material or foam, forming, in one step, a tire wherein the packaged belts, plies and beads are optimally positioned. The use of the packaged belts, plies and beads thereby providing a tire that is essentially perfectly balance with the belts, plies and beads optimally located therein. The invention uniquely provides for a formation and fitting of a package containing belts, plies and beads, or combination thereof, into a mold to receive an elastomeric materials injected therein to produce, in a single step a finished tire. Nor has a use of a pre-cured elastomer heretofore been employed for containing tire belts, plies and beads to form a package that is to receive an elastomer cast therearound. In practice, the formed tire can be solid, contain a center cavity, be pneumatic or non-pneumatic, and the elastomer can be rubber, urethane, or the like, and the molding precess can be injection molding, spin casing, or a like manufacturing method, within the scope of this disclosure.

SUMMARY OF THE INVENTION

It is a principal object of the present invention to provide for forming an elastomeric tire where a tire core is arranged as a package containing belts, plies and beads for positioning in a mold to receive an elastomer injected therearound, both curing and encapsulating the package components and produce, in a single step, a tire where the belts, plies and beads are optimally positioned in a finished tire that is homogenous throughout.

Another object of the present invention is to provide for forming the package of belt, plies and beads encapsulated in a pre-cured elastomer and for positioning the package in a mold to receive an elastomer injected therearound curing together both the pre-cure elastomer and elastomer to produce a homogeneous tire having a suitable hardness.

Another object of the present invention is to provide, for forming the package, thin sections of pre-cure elastomer by cold rolling, the pre-cured elastomer to sections of fabric, forming a sandwich of belts and plies encapsulated within the pre-cure elastomer, with that package then shaped by passage of the package through additional cold rollers into a tire core shape and including turning the core ends inwardly around beads, completing the forming the package of belts, plies and beads for positioning in a mold.

Another object of the present invention is to provide a package of belts, plies and beads, and a system for its formation, for positioning in a mold wherein an elastomer is directed, where the package is formed utilizing a pre-cure elastomer that is a mixture of a selected isocyanate and polyol combined to have a hardness that will allow it to be rolled into thin layers that are, in turn, cold rolled with sections of fabric as the belts and plies to form a sandwich that is then shaped into a continuous tire core whose side walls are turned around beads, with the package for positioning in a mold to cure upon exposure to an exothermic heat of reaction of elastomer constituents as are mixed together and passed into the mold, forming a homogenous a tire that exhibits appropriate tread and side wall hardness and contains the sandwich of optimally positioned belts, plies and beads.

Still another object of the present invention is to provide a process for forming an elastomeric tire that includes a utilization of a spin casting mold that receives and maintains, in proper position, a package of a combination of beads, plies and belts maintained on a support or encapsulated in a pre-cure elastomer, and includes spray nozzles directed into the mold for, upon commencement of mold spinning, directing sprays of elastomeric material into the mold to mix together and flow around and curing to the encapsulated the package providing a cured elastomer tire that has a desired hardness.

Still another object of the present invention is to provide a process for forming an elastomeric tire where, by a packaging of the individual belts, plies and beads, or a combination thereof, and positioning of the package in a mold, to receive an elastomer constituents sprayed therein to encapsulate the packaged items, providing a finished tire the having an optimal positioning and balance of the contained belts, plies and beads, with the sections of belts and plies as are laid up in the sandwich, at optimal fiber crossing angles to one another, forming, in a single molding operation, an elastomeric tire that is in balance.

The present invention is in a packaging of belts, plies and beads into a unit for positioning in a mold that an elastomer is passed into, forming an elastomer tire, where the elastomer can be natural or synthetic rubber, urethane, or the like. The present invention is for use in a system or process of tire manufacture utilizing a pre-cure elastomer that is formed by the mixing of an isocyanate and polyol under conditions to produce a malleable material that can be conveniently rolled into sections to have a hardness of approximately ten (10) derometers. The pre-cure elastomer sections, when cold rolled onto sections of fabric, adhere therewith to form a sandwich that is then cold rolled into a tire core shape. Core side wall ends are folded around beads, and, with, as required, a continuous steel belt is fitted around the sandwich outer surface. The package is for fitting into and is supported in a mold to receive elastomer constituents passed therein that react exothermically, producing heat. Which heat of reaction cures together both the mixed elastomer constituents and the pre-cure elastomer, encapsulating the package, and providing a homogenous tire having a desired tread and side wall hardness.

A mold for use in forming the elastomeric tire preferably, utilizes a spin casting process like those set out in U.S. Pat. Nos. 4,855,096 and 4,943,323; and 5,906,836, and 6,165,397, that the present inventor is a joint inventor of, and improvements thereto, or other molding process, such as injection molding, and, it should be understood, all of which processes can be practices with the invention, within the scope of this disclosure. The invention provides for the mounting or encapsulation of tire belts, plies and beads, or combination thereof, in a package that is then suspended in a mold to receive an elastomeric material flowing therearound, forming, in a single molding operation, a finished tire. Preferably the package utilizes a pre-cured elastomer formed to have a suitable hardness for rolling into narrow sections that are for laying up on a form or mandrel with sections of fabric that constitute belts and plies, that are cold rolled together, forming a sandwich that is then cold rolled into, essentially, a shape of a tire core. With, in that cold rolling, the opposite sandwich edges are folded around beads, and, as required, a continuous steel belt or belts can be fitted around the package outer surface, with layer of pre-cured elastomer rolled thereover, completing the package of belts, plies and beads for positioning in a mold.

The pre-cured elastomer as is preferred for forming the package, is manufactured to have a hardness that is suitable for cold rolling and will be finally cured upon heating. Which heating, in the tire manufacture, is preferably provided by an exothermic reaction that occurs with the mixing of the elastomer constituents, with that heat causing the curing together of the pre-cure elastomer and elastomer constituents, providing a homogenous finished tire. The injected and pre-cure elastomers are cured to design hardness as is appropriate for the tire tread and side wall, and provides a homogenous structure throughout the formed tire that contains the belts, plies and beads that are optimally positioned therein, providing a balanced tire. In practice, the combined elastomer as passed into the mold and the pre-cure elastomer have, after curing, a hardness of from sixty five (65) to eighty five (85) derometer, for a finished tire.

Still other benefits and advantages of the invention will become apparent to those skilled in the art to which it pertains upon a reading and understanding of the following detailed specification.

DESCRIPTION OF THE DRAWINGS

The invention may take physical form in certain parts and arrangement of parts, and a preferred embodiments of which will be described in detail in this specification and illustrated in the accompanying drawings which form a part hereof:

FIG. 6A is an enlarged sectional view taken along the line 6A—6A of the mold of FIG. 6 with the mold halves closed together and showing the package with the bladder fitted therein, showing a bladder annular portion as including slots to receive and bind to ridges of the mold annular portion, supporting the core package and inflated bladder in the mold to receive the elastomer flow therearound and showing stand-offs positioned between the mold wall and core package sides, for further holding the package in position;

DETAILED DESCRIPTION

Figure 1:
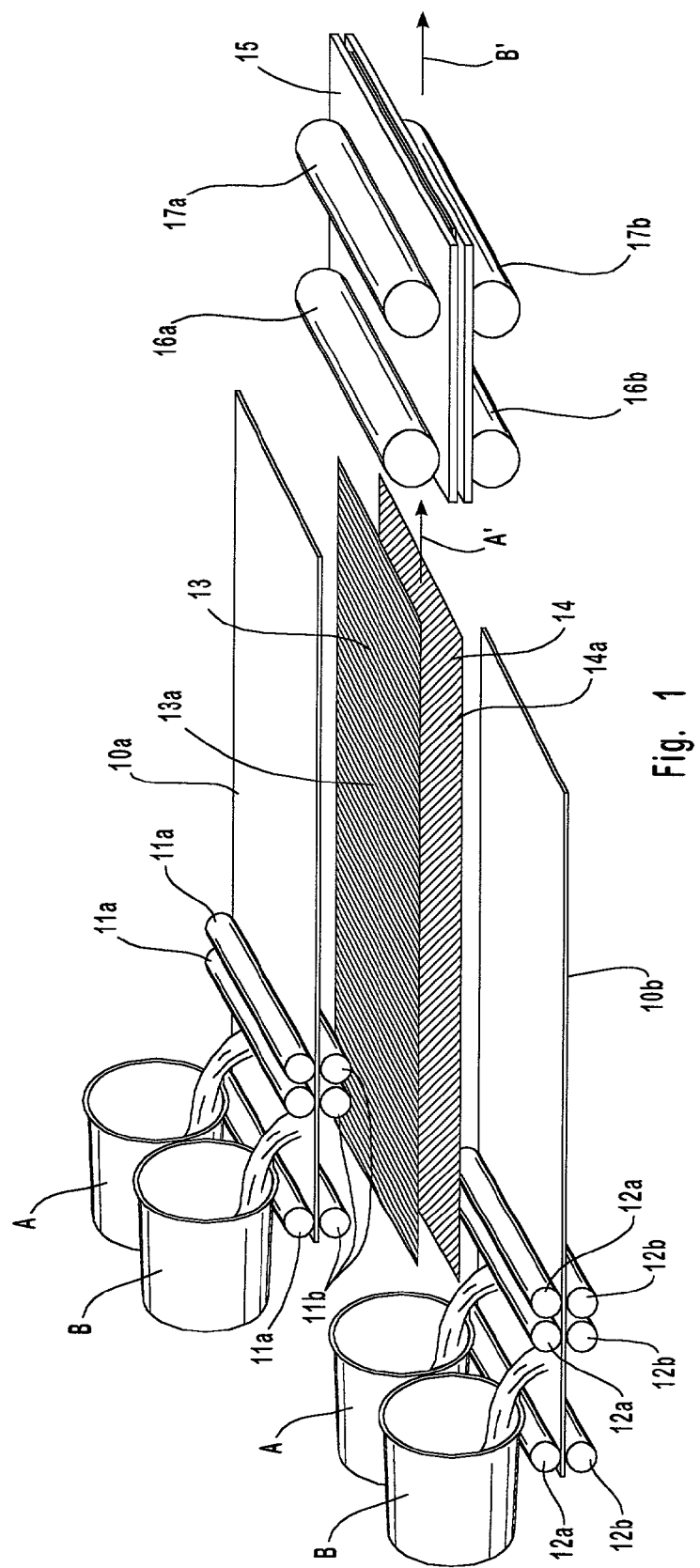
FIG. 1 shows a flow schematic for manufacturing pre-cured elastomer sections that are cold rolled with sections of fabric to form a sandwich, with pre-cure elastomer sections shown as formed by mixing liquids identified as A and B liquids that are poured together and is cold rolled into flat thin sections that are laid up as a sandwich over sections of fabric that are laid up at different crossing angles.

The invention resides in the formation of a tire core package where tire belts, plies and beads, or a combination thereof, mounted in or on a material that is fitted and positioned in a mold to receive an elastomeric material flow traveling around and encapsulating the package, preferably by a spin casting process, forming, in a single casting step, an elastomeric tire. As an example of a preferred material for forming a tire core package 20, as shown in FIG. 3, FIG. 1 shows a schematic of a process of manufacture of sections of pre-cure elastomer that are rolled into thin sheets 10a and 10b for laying up over sections of fabric 13 and 14. Which laid up sections of pre-cure elastomer and fabric material are then cold rolled together by passage, as illustrated by arrow A', between pairs of rollers 16a and 16b and 17a and 17b, forming a sandwich 15. Which sandwich 15 is for forming into a tire core shape, as shown in FIG. 2, by passage, as illustrated by arrow B', between a series of cold rollers R and the ends of the sandwich are joined, as shown in FIG. 3, into a the continuous tire core package 20.

In FIG. 1, separate liquids, identified as A and B, are shown poured together, with each combined pour forming pre-cured elastomer that is then rolled through opposing rollers 11a and 11b and 12a and 12b, respectively, forming thin separate sheets 10a and 10b. The sheets of pre-cure elastomer are each positioned over sections of fabric, and two separate sections of fabric 13 and 14 are shown. Though, it should be understood, any number of sheets of pre-cure elastomer and fabric can be laid up over one another to from the sandwich 15. The sections of fabric are preferably laid up over one another so as to have their respective fibers 13a and 14a, crossing at design fiber angles. Which fiber crossing angles, for example, are shown in FIG. 1 as approximately forty five (45) degrees to one another, though, its should be understood, the fabric fiber crossing angles can be any design angle, and the sandwich can include multiple fabric sections whose fiber crossing angles are varied to one another, in accordance with the portion or section of the tire as they are intended to reinforce, and as to whether they are to function as belts or plies. It should, accordingly, be clearly understood, that while two sections of fabric 13 and 14 are shown, additional sections can be positioned between layers of pre-cure elastomer 10a and 10b, and that additional layers of pre-cure elastomer can be fitted between which sections of fabric to the extent that each layer of fabric is sandwiched between upper and lower layers of pre-cure elastomer, within the scope of this disclosure.

The preferred chemicals that constitute the A and B liquids, as shown in FIG. 1, are preferably an isocyanate as liquid A, and a polyol as liquid B, with the percentages of each selected to produce a pre-cure elastomer having an initial hardness of approximately ten (10) derometers. In practice, the temperature of mixing is controlled so as to provide a curing of the elastomer compound to have a hardness of approximately ten (10) derometers, with further curing deferred until the pre-cure elastomer is subjected to heat in excess of approximately one hundred forty (140) degrees F. After formation, the thin sheets of pre-cure elastomer 10a and 10b are laid over the sections of fabric 13 and 14 forming a sandwich 15, with the sandwich then cold rolled through opposing upper and lower pairs of rollers 16a and 16b and 17a and 17b, respectively, shown as arrow A. The sandwich 15 then travels, shown as arrow B, through shaping rollers as are shown in FIG. 2.

Figure 2:
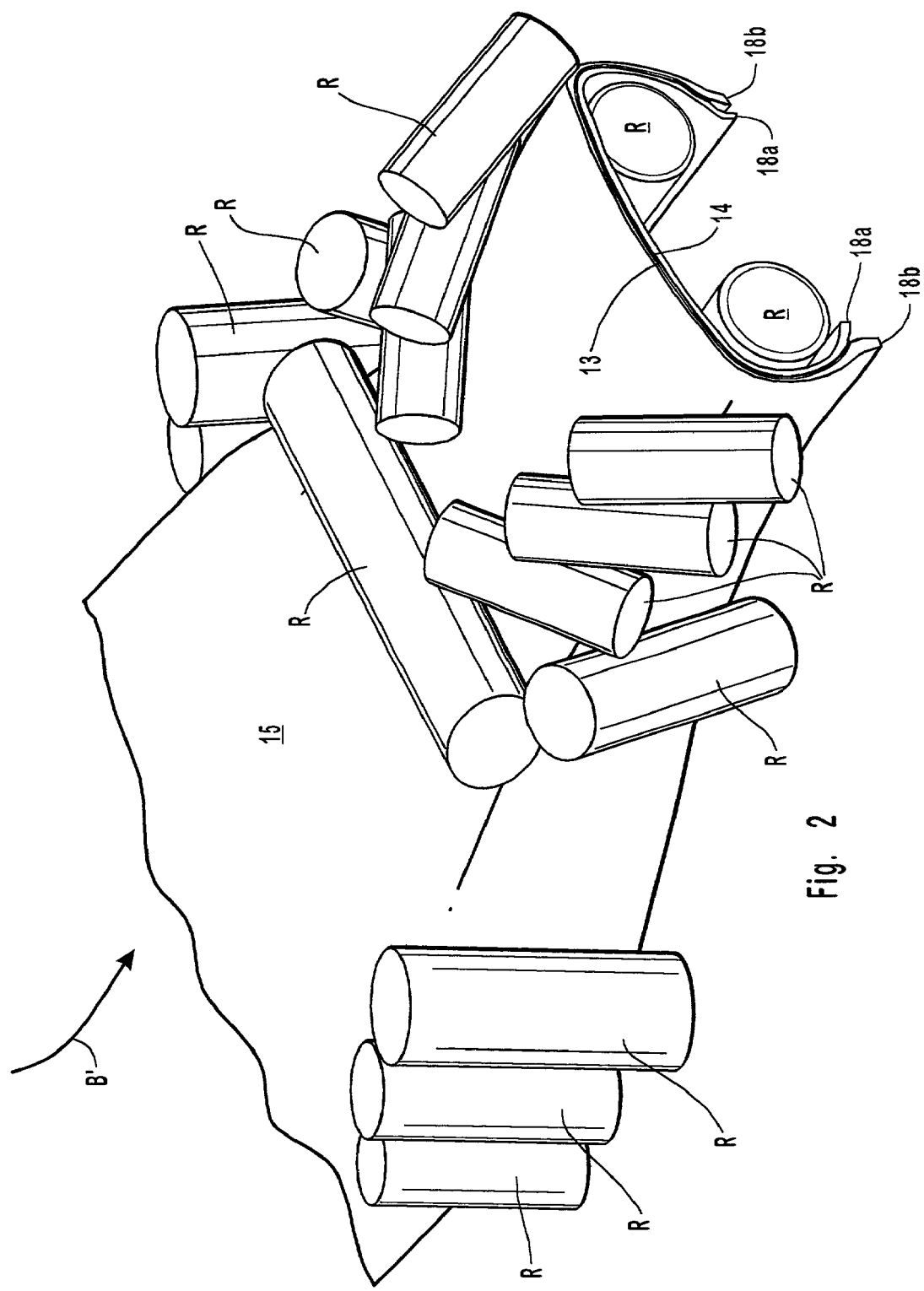
FIG. 2 shows the flat sandwich of FIG. 1 being fed, shown as arrow B' through a series of cold rollers, forming a shape of a tire core.
Figure 3:
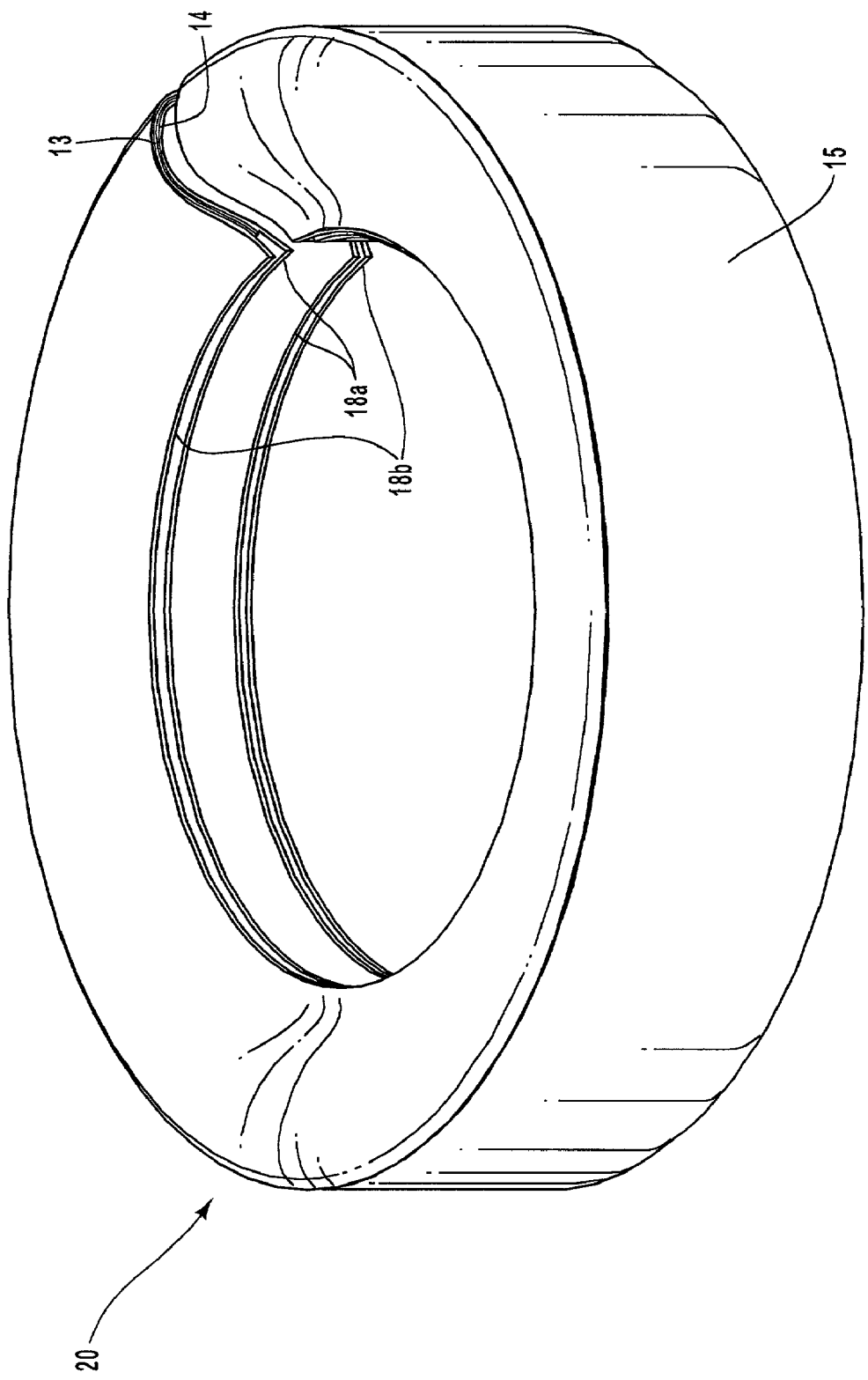
FIG. 3 shows the sandwich having a tire core section of FIG. 2 as having its ends joined into a continuous round tire core and showing spaced inner and outer side wall ends as over hanging, forming a slot therebetween.
Figure 4:
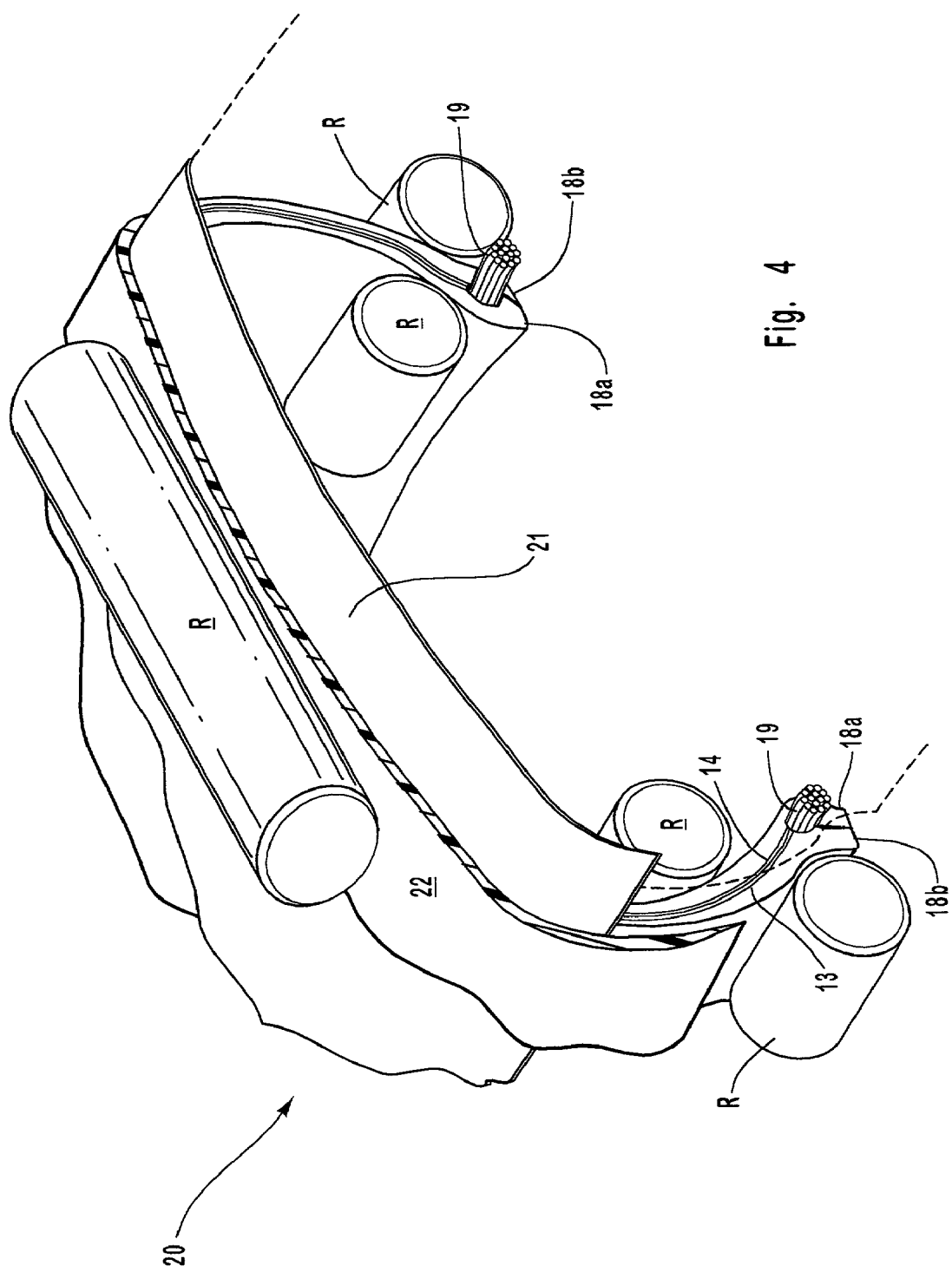
FIG. 4 shows the spaced side wall ends slot of FIG. 3 as each having received continuous bead fitted therein that butts against the end surface of the sections of fabric and with the pre-cure elastomer side wall ends shown as being rolled together, encapsulating the beads in the tire shaped section side wall ends, and showing a continuous steel belt as having been fitted around the tire shape core top portion with a section of pre-cure elastomer shown being rolled thereover, completing a package of belts, plies and beads encapsulated in pre-cure elastomer.

FIG. 2 shows a schematic of a portion of a cold rolling machine that provides for forming the sandwich 15 into a tire core having a cross section like that of a tire interior portion. With, in FIG. 3, sandwich 15 is shown as having been cut and the ends joined into a tire core package 20 that is to receive an elastomer press fitted therearound, encapsulating the sandwich therein. Additionally, the tire core package 20, to provide for mounting beads 19, as shown in FIG. 4, includes parallel end edges 18a and 18b that are open therebetween, as shown also in FIG. 1. Shown in FIG. 4, the tire core package 15 receives beads 19 fitted therebetween to engage the ends of the sandwich of sections of fabric 13 and 14. In FIG. 4 a continuous belt 21, that may be formed from steel, graphite or nylon fibers, or a like inelastic material, is shown fitted around the tire core package outer surface and an outer section 22 of pre-cure elastomer is shown fitted over the continuous belt 20, extends down the sandwich 15 sides and is rolled into the package 20 by roller R. Which belt 21 inclusion to package 20 is dependent upon the type and anticipated load that the tire being manufactured is intended to carry.

Figure 5:
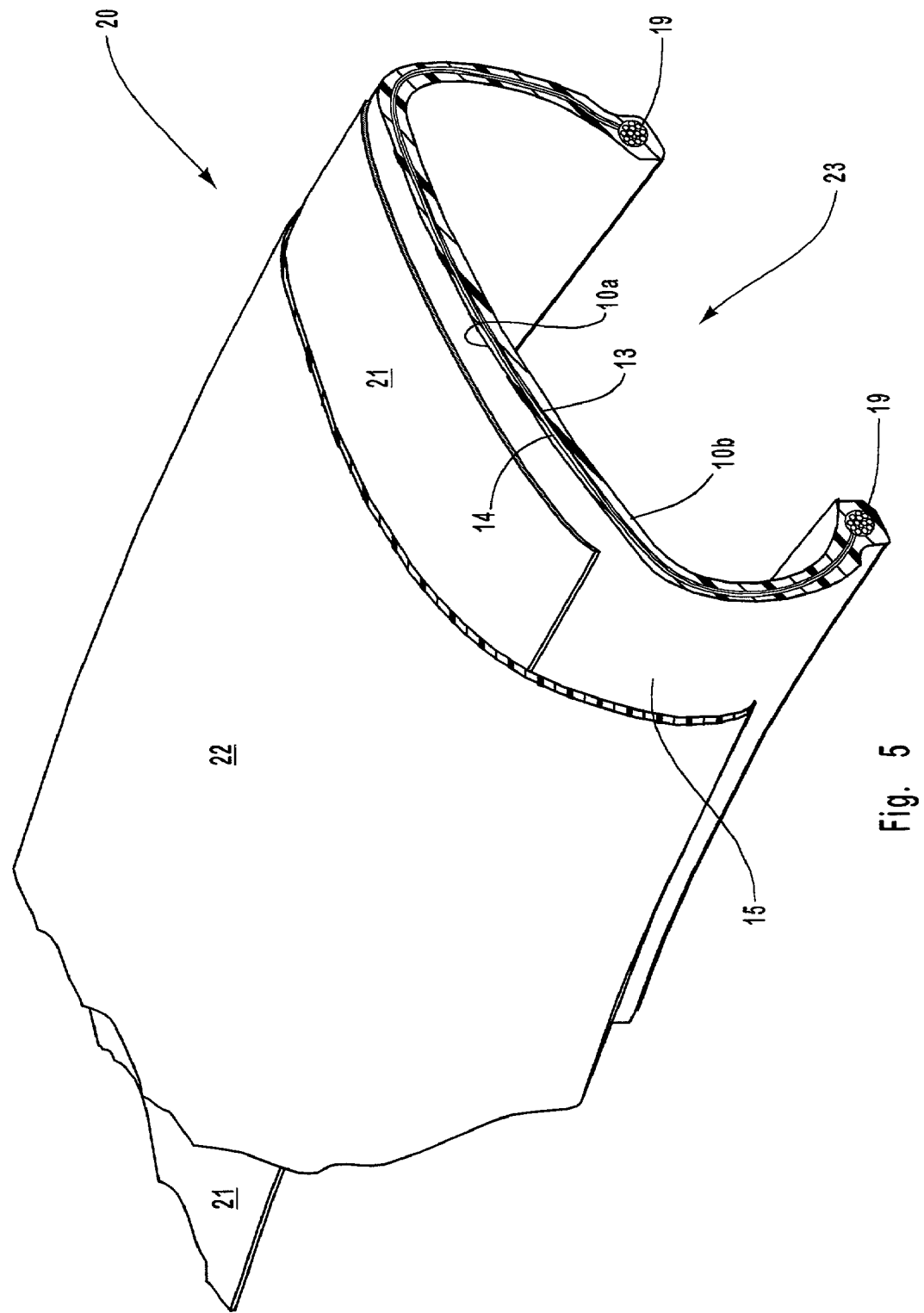
FIG. 5 shows a profile perspective view of a section of the tire core package of FIG. 4.
Figure 12:
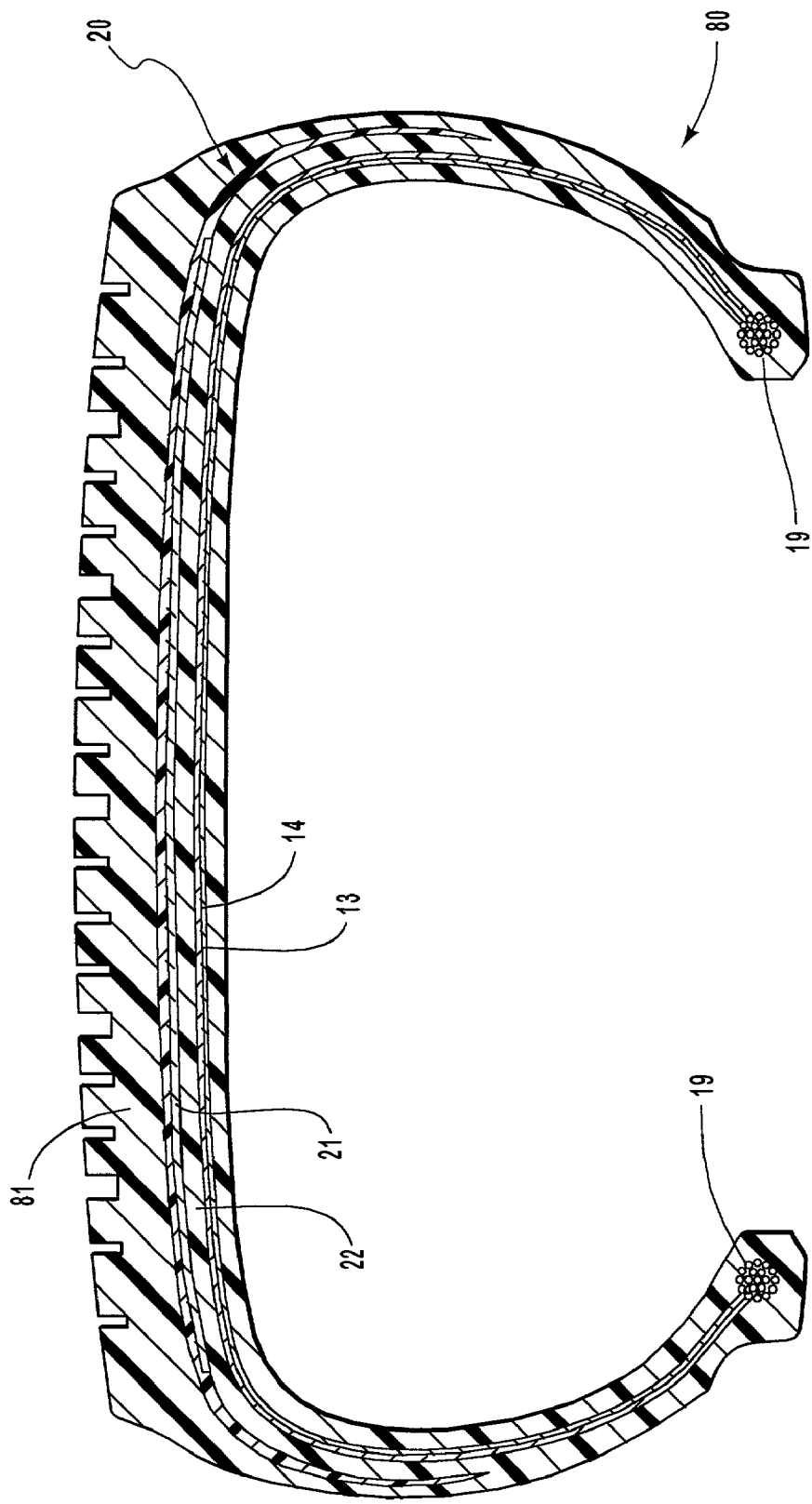
FIG. 12 shows a cross section of a finished elastomeric tire after it has been removed from the mold as containing the core package support removed therefrom.

FIG. 5 shows the completed tire core package 20 that includes the belt 21 as having parallel edges 18a and 18b that have been closed and sealed together over each of a pair of beads 19 that, it should be understood, can be steel cables or are formed from another inelastic material, such as graphite fibers, within the scope of this disclosure. The package 20 of FIG. 5 is for positioning is a mold to receive an elastomer material directed therearound to form a tire, with a center cavity 23 of which package becoming the tire interior. Which elastomer is preferably formed, as set out above, by a mixing together of chemicals from containers A and B, as set out in detail hereinbelow, with the mixing providing an exothermic reaction producing heat to cure the pre-cure elastomer. Which elastomer as is passed into the mold, curing together with the pre-cure elastomer of the package 15, forming an elastomer that is homogenous throughout that contains the described belts, plies and beads in a finished tire 80, as shown in FIG. 12.

Shown in FIG. 2, the sandwich 15 of pre-cure elastomer and sections of fabric are fitted onto a turning mandrel whereagainst cold rollers R are turning. The cold roller to compress the pre-cure elastomer and fabric sections together and force the pre-cure elastomer to flow into the spaces between the fabric fibers. The pre-cure elastomer is thereby bonded to the belts and fabric sections that will become tire plies and the tire belt or belts, forming the tire core package 20 that is shown in FIG. 3. FIG. 4 shows the tire core package 20 passing through additional rollers R that, respectively, press an additional section of pre-cure elastomer 22 onto a belt 21 that is formed from an in-elastic material such as steel, carbon or nylon fibers, or the like. With, as shown in FIG. 4, the package 20 parallel edges 18a and 18b are pressed together, encapsulating beads 19 and urging which beads into contact with the sides of the sections of fabric 13 and 14.

The tire core package 20, formed as set out above, is shown in the sectional view of FIG. 5 as including belts, plies and beads encapsulated in a pre-cure elastomer that has been formed, as set out above. This package 20 is for fitting into a mold, preferably a spin casting mold, to receive an elastomer sprayed therein, as mold spinning is begun. So arranged, a belts, plies and beads in the finished tire will be balanced and are ideally spaced, with the formed tire having an optimal hardness, as discussed below.

Figure 8:
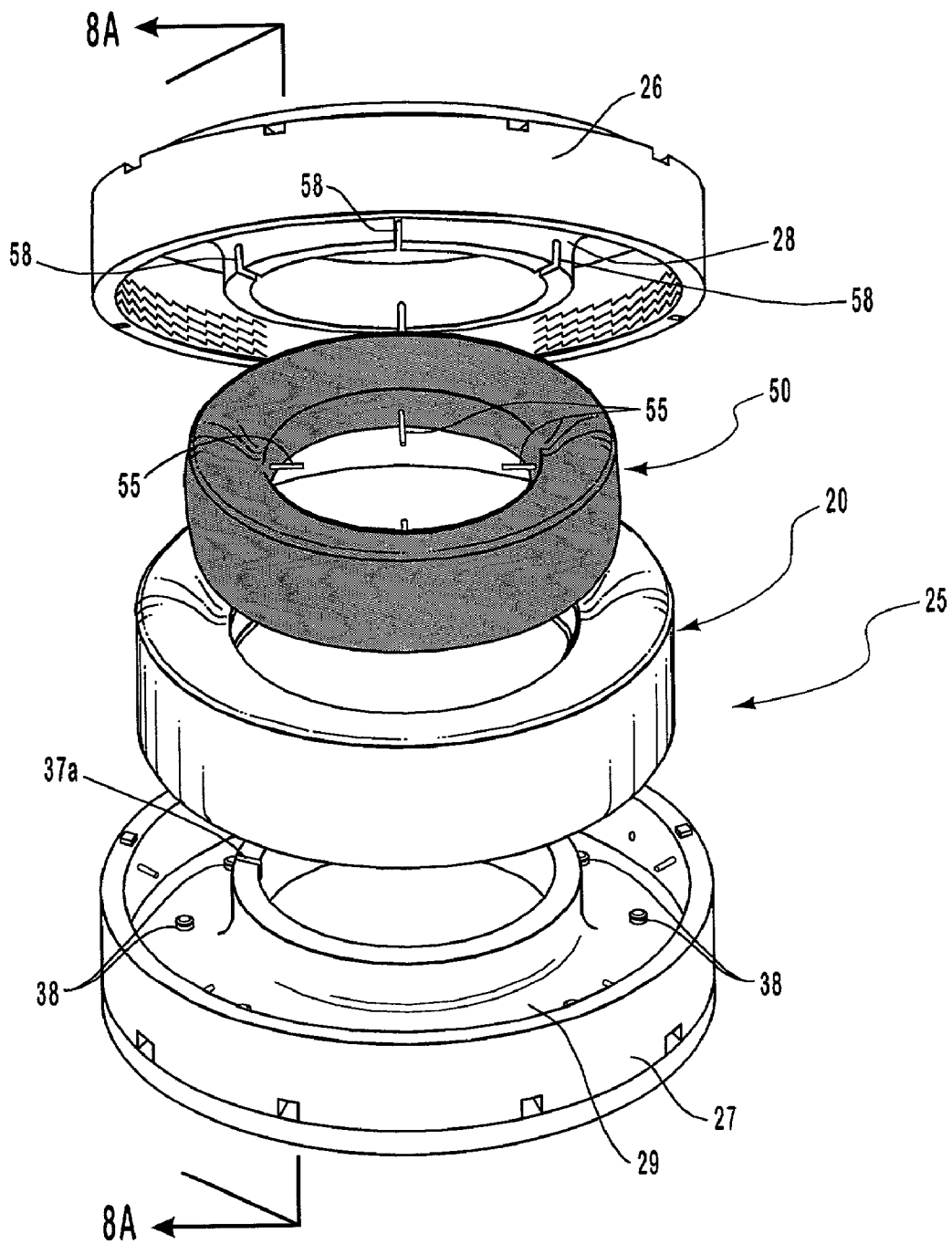
FIG. 8 shows a view like that of FIGS. 6 and 7 only showing the core package support as a solid styrofoam, or like material, ring that is for receiving the core package formed therearound and includes bolts shown projecting radially inwardly from the ring annular portion for fitting through aligned notch formed in the mold halves contacting surfaces.
Figure 8A:
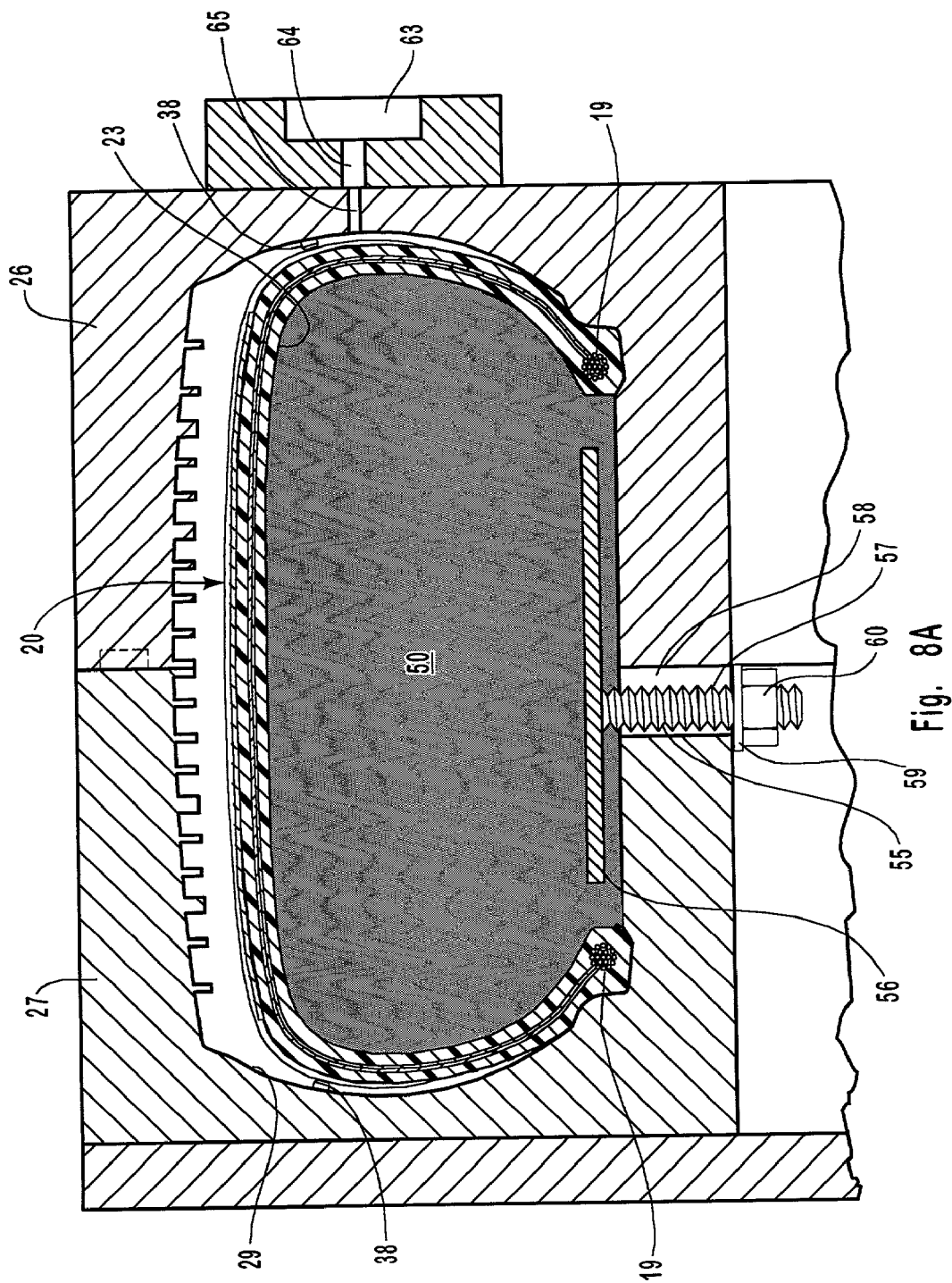
FIG. 8A is an enlarged sectional view taken along the line 8A—8A of FIG. 8, showing the styrofoam ring mounting the core package maintained between the mold halves, and showing a bolt of the foam ring fitted through the mold halves aligned holes and has received a nut turned thereover, suspending the styrofoam ring and mounted core package in the closed mold.

While the above disclosure sets out the preferred tire core package manufactured into a sandwich utilizing cold rolled pre-cure elastomer and the sandwich, in turn, cold rolled into a tire core shape, it should be understood that, within the scope of this disclosure, the package 20 can be formed around a disposable mandrel, and an example of such shown in FIGS. 8 and 8A, that shows a disposable styrofoam mandrel 50. Shown in FIG. 8A, the preferred styrofoam mandrel 50 has an outer shape of a tire core and the styrofoam as is selected for the manufacture is preferably one that will vaporize, forming a gas, at a temperature that is less than the temperature generated in a tire forming mold by the exothermic heat of reaction of the mixing to the selected elastomer constituents. Thereby, when the elastomer is injected into the mold, the styrofoam mandrel will gasify and that gas is then vented from the mold, leaving the formed tire wherein the belts, plies and beads are encapsulated. Alternatively, the material of the disposable styrofoam mandrel can be selected to not gasify during the tire molding process, with the mandrel to then function as a filler, remaining with the tire, during tire transport, to be removed by a tire dealer or purchaser, with the styrofoam mandrel to stabilize the shape of the tire until it is ready for use. In fabrication of the tire core package 20 on disposable styrofoam mandrel 50, as shown in FIG. 8A, like the above described procedure where sections of pre-cure elastomer are laid up over sections of fabric, the styrofoam mandrel 50 also receives the layers of fabric 13 and 14 between layers of pre-cure elastomer 10a and 10b, forming plys of the tire core package 20, and may include an inelastic belt 21 maintained below a layer of pre-cure elastomer 22. The pre-cure elastomer sections 10a and 10b and 22, like those described above with respect to FIGS. 1 through 5, may be formed to have a like or lesser hardness, and may be applied by hand or with a use of rollers, providing the applied pressure on the sandwich is less than the disposable styrofoam mandrel crushing pressure. The construction of the tire core package 20 is complete by the inclusion of beads 19 that are laid up in the pre-cure elastomer at the core side wall ends. So arranged, the disposable styrofoam mandrel 50, whereon the tire core package 20 is formed, is positioned and maintained in a mold 25, as shown in FIG. 8, that is preferably a spin casting mold system. The tire core package 20 formation over the styrofoam core 50 mounting and mold operation is discussed herein below.

The tire core package 20, as set out above, is preferably formed by a laying up of sections of pre-cure elastomer like that described above. It should, however, be understood that the tire core package 20 fabric sections 13 and 14 and the belt 21 can be secured onto the disposable styrofoam mandrel 50 as with sections of green rubber, an adhesive, or other appropriate material for maintaining the tire core package in position in a mold that receives an elastomer passed therein to flow around and encapsulate the tire core package 20. The invention, it should be understood, is in the tire core package itself, and its placement in a mold to receive an elastomer that encapsulates the package, forming, in a single molding step, an elastomeric tire containing optimally position belts, plies and beads.

Figure 6:
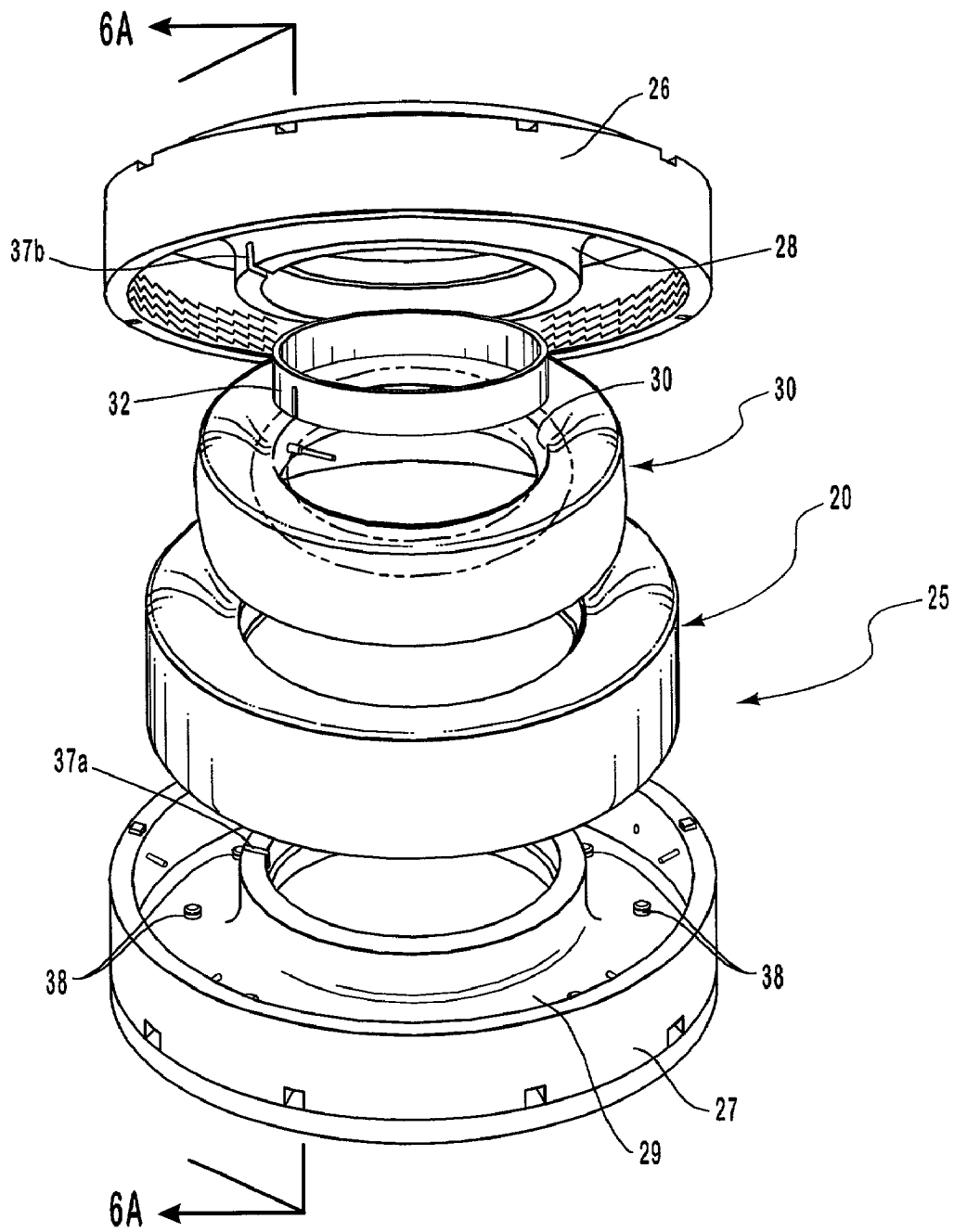
FIG. 6 shows an exploded view of mold halves with the tire core package of FIGS. 4 and 5 aligned therebetween and showing a bladder for fitting into the core package that, when inflated, extends outwardly from the closed mold hub to maintain the tire core package position in a mold cavity, to allow for a free flow of elastomer therearound.
Figure 7:
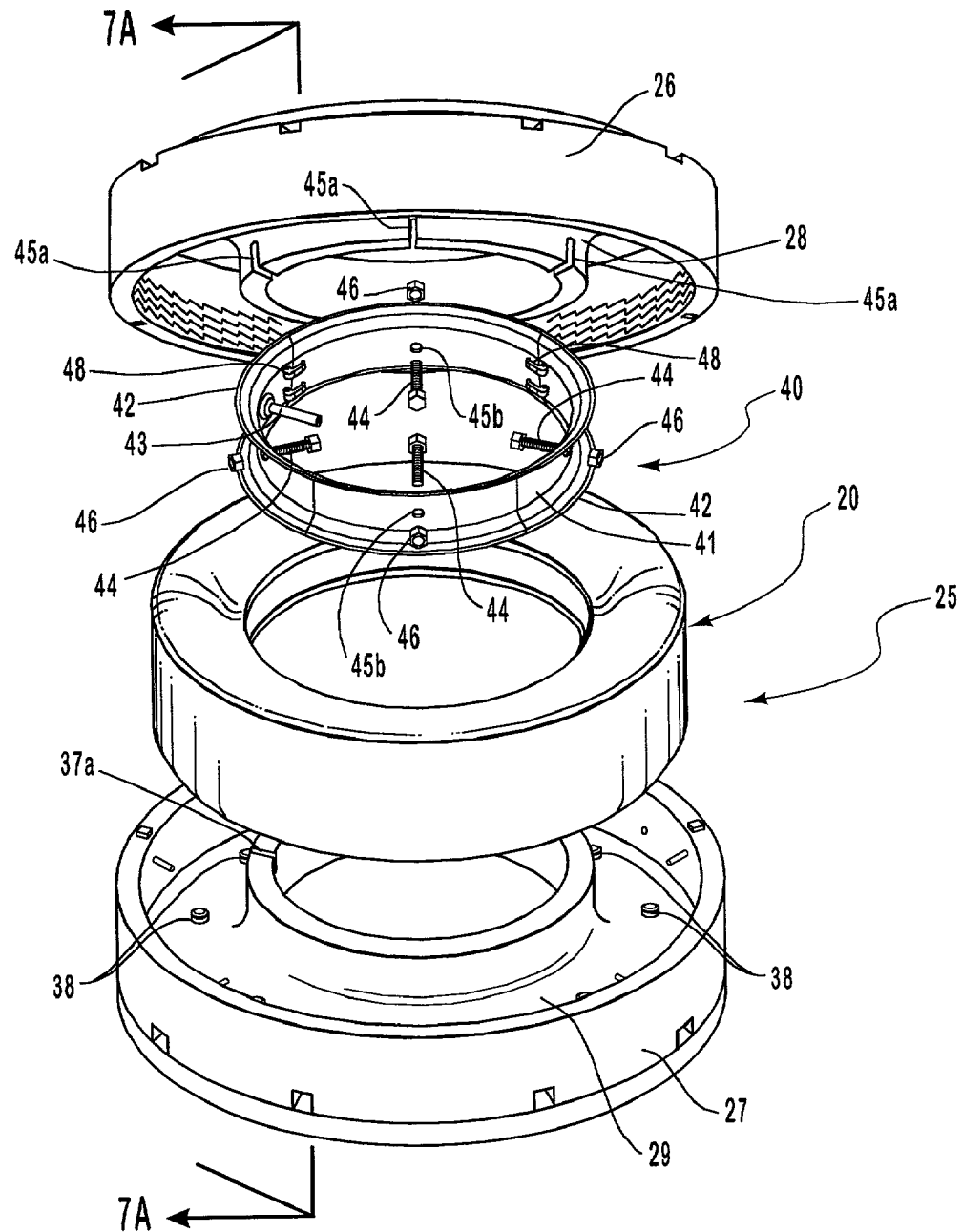
FIG. 7 shows a view like that of FIG. 6 except that a hoop is shown in place of the bladder that is aligned to fit across the core package beads, to clamp thereto when the core package is inflated, and includes a valve stem for passing air therein and bolts for fitting through the mold halves at aligned slots, with each bolt to receive a nut turned thereover to maintain the hoop suspending the core package in the mold cavity and allow for a free flow of elastomer therearound.
Figure 7A:
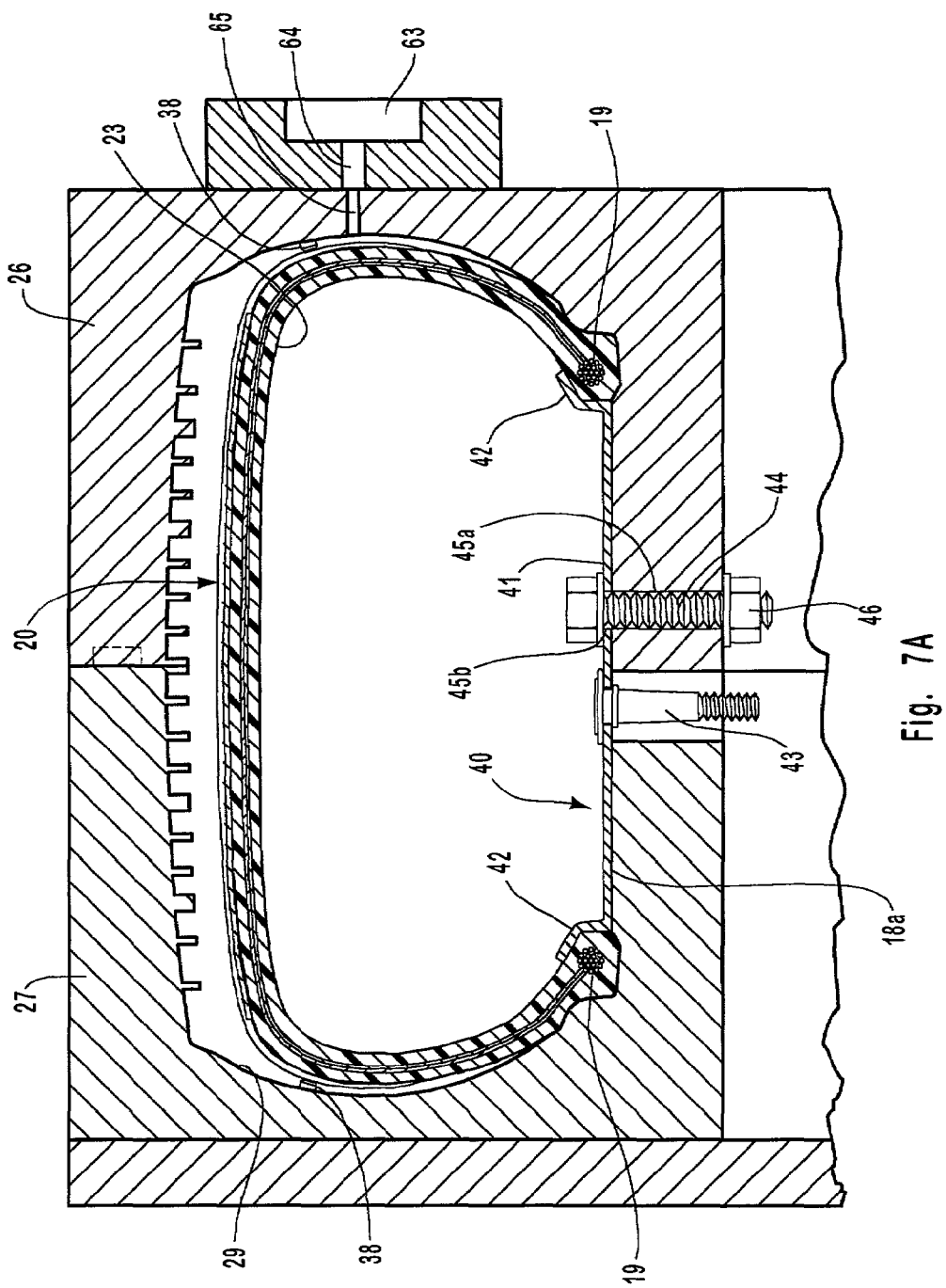
FIG. 7A is an enlarged sectional view taken along the line 7A—7A of FIG. 6 showing the core package mounted to the hoop that has been inflated through a valve stem and showing a bolt fitted through the plate and that is passed through aligned notches formed through the mold halves, and with each bolt having had a nut turned thereover supporting the core package in the mold cavity.

To provide tire core package positioning in a mold that an elastomer is directed into, FIGS. 6, 6A, 7, 7A, 8 and 8A show different arrangements for positioning and supporting the tire core package within upper and lower halves 26 and 27, respectively, of a clam shell type mold 25. Shown in FIG. 6, are open mold halves 26 and 27 with a bladder 30 positioned below a cavity 28 of the upper mold 26, and with the tire core package 20 of FIG. 5 shown aligned between the bladder and a cavity 20 of the lower mold half 27. In practice, the bladder 30 is for fitting into the tire core package 20 that the mold upper and lower halves 26 and 27 are closed over. Prior to which fitting, an annular ring 32 is positioned, as shown in FIG. 6A, within and between the mold halves 26 and 27 annular portion 31. The annular ring 32 ends to engage piers 33 of which mold halves formed in the annular portion 31, to receive slots 33 a formed in the bladder annular portion, as shown best in FIG. 6A. When the bladder is expanded by a passage of air under pressure therein, the bladder slots close against the piers 30 inner walls, binding against the pier edges 34, and with the package bead 19 ends binding against a pier 33 wall 32a, supporting the bladder 30 and tire core package 20 to extend outwardly from the mold 25 annular ring 32. The annular ring 32 is fitted with a valve stem 35 that is maintained to the annular ring and included a threaded end to receive an air hose nozzle fitted thereover, not shown. The valve stem 35 is to be fitted through aligned lower and upper slots 37a and 37b, respectively, that are formed across the intersection of the closed mold halves 26 and 27, with the valve stem 35 projecting radially inwardly from the mold 25 center area. So arranged, when the bladder 30 is aired it expands against the inner surface of the tire core package, with the slots 33a pinching against the piers 33 top edges 34, providing for a lock of the bladder 30 to the mold 25 annular portion and urging the tire core end surface 32a against the pier s 33a, supporting the tire core package in the mold cavity. Should, however, additional support be needed to maintain the tire core package 20 in a cantilevered attitude from the annular ring 31, exactly centering the tire core package in the mold 25 cavity, stand-offs 38, that are shown as short cylinders, can be installed in the lower mold half cavity 29, as shown in FIG. 6A, and which stand-offs 38 are positioned between the tire core package 20 and the wall of the lower mold half 27 cavity 29. A preferred stand-off 38 is formed from the above described pre-cure elastomer that will cure with the elastomeric material as is passed into the mold cavity during tire casting. In practice, as discussed in detail hereinbelow, the mold halves shown in FIGS. 6 and 7and 8 through 11, are preferably components of a spin casting apparatus where the mold halves are closed together, as shown in FIGS. 6A, 7A, 8A and 10 and 11, to receive a flow of an elastomer mixed from two components and sprayed into a spray trough 63 that feeds into a slot 64, and, in turn, vents into a flow passage 65 into the upper mold 26 and into the mold 25 cavity, as shown in FIGS. 6A, 7A, 8A.

FIG. 7 shows mold 25 upper and lower mold halves 26 and 27 spread apart to receive a tire core package 20 aligned therebetween, and FIG. 7A shows the mold 25 as having been closed with the mold 25 annular portion shown as including a hoop 40 that has been fitted across the tire core package 20 open center, extending to the tire core package bead 19 ends. The hoop 40 is shown in FIG. 7 aligned for fitting in the tire core package 25 and in an end sectional view in FIG. 7A, and is preferably formed from a stiff metal. The hoop 40, as shown, includes a flat center portion 41 that is for fitting into the cavity 29 of the upper and lower mold halves 26 and 27. The hoop 40 includes opposite ends 42 that are bent upwardly and outwardly to fit partially over inner end surfaces of the tire core package side wall ends that contain the beads 19. For passing air into the tire core package 210 interior a valve stem 43 is mounted through the hoop 40 flat center portion 41 to pass air therethrough. Spaced bolts 44 are shown fitted and secured through the hoop flat center portion, at equidistant intervals therearound, that are for fitting through holes formed as opposing slots 45a and 45b through the annular portions of the upper and lower mold halves 26 and 27 that form holes when the mold halves are positioned together, as shown in FIG. 7A. Each bolt 44 is to receive a nut 46 turned thereover, drawing the hoop 40 flat center portion 41 into the mold 25 annular area, as shown in FIG. 7A. The spaced bolts 44, as shown, project radially inwardly from the hoop inner surface, with each bolt to fit through opposing grooves 45a and 45b that are formed across the upper and lower mold halves 26 and 27 annular portions, and each bolt receives a nut 46 turned thereover. Which nuts 46, when tightened, pull the hoop center portion 41 into mold halves slots 45a and 45b, pulling also the hoop ends 42 into tight fitting engagement with the inner side wall end surfaces at beads 19 of the tire core package 20. So arranged, pumping air, under pressure, into the tire core package 20 through stem 43 inflates the tire core packing, causing it to extend outwardly from the hoop, properly positioning the tire core package in the mold 25, as shown in FIG. 7A. Further, should is be required to slightly lift the lower side wall portion of the tire core package 20 off of the lower mold half cavity 29 face, then stand-offs 38, as shown in FIG. 7A can be so used. Further, alternatively, the hoop 40 can be secured to one mold half cavity annular surface, with the other mold half cavity annular surface to slide thereunder when the mold halves are closed together, negating and need for bolting the hoop 40 to the closed mold 25 annular surface. With, to mount the tire core package 20 in a mold half, prior to mold half closure, one tire core package bead end is slid under a hoop end 42 and the tire core package other hoop end 42 is stretched across the hoop center portion 41 and fitted under the other hoop end 42, the elastic characteristics of the tire core package both allow for which stretching and provide, with the tire core package mounted to the hoop ends, as shown in FIG. 7A, for passing air under pressure through the stem 43. The tire core package 20 is thereby extended out from the hoop 40, properly positioning it in mold 25 to receive an elastomer flow therearound, forming the tire 80 of FIG. 12. Which securing of hoop 40 to one of the mold half annular portions, it should be understood, is within the scope of this disclosure.

FIGS. 8 and 8A, like FIGS. 6 and 7 and 6A and 7A, respectively, shows mold 25 upper and lower halves 26 and 27 open. Distinct to FIGS. 8 and 8A, a disposable styrofoam mandrel 50 is shown between which mold halves whereon the tire core package 20 is formed, as set out above. The disposable styrofoam mandrel, as set out above, is both for forming the tire core package 20 thereon and also serves as a mount for positioning the tire core package 20 in the mold 25, supporting and positioning it therein. To provide support and positioning of the disposable styrofoam mandrel 50, as shown in FIGS. 8 and 8A, the mandrel includes spaced bolts 55 mounted at equal intervals around and projecting radially inwardly from amounting plate 56 that is embedded in the mandrel, adjacent to its annular surface. As shown in FIG. 8A, the bolt 56 is secured at its head end in the styrofoam mandrel body to project radially inwardly and each includes a threaded body portion 57. The bolt 56, like the bolts 44 described above with respect to FIGS. 7 and 7A, is for fitting a hole formed by opposing slots 58 that are formed at spaced intervals across the contacting annular edges of the respective upper and lower mold halves 26 and 27. Which slots are like the slots 45a and 45b of FIG. 7A and, with the mold halves closed together, form the holes 58 wherethrough the bolts 55 are fitted that each receive a washer 59 fitted thereover and a nut 60 turned over the bolt 55 threaded portion 57. The turning of which nut 60 over the bolt 55 end draws the styrofoam mandrel 50 mounting the tire core package 20 tightly against the closed mold 25 annular inner surface, positioning and supporting the tire core package in which mold to receive a flow of an elastomer therearound in the tire casting process. Which disposable styrofoam mandrel 50 can be pulled out of the finished tire or can be left in the tire for support during shipping for removal as by pulling it from the tire interior at the tire destination.

Additionally, it should be understood, within the scope of this disclosure, the tire core package 20 of the invention can be formed utilizing a segmented mandrel that is assemble in the shape of the disposable styrofoam mandrel 50 of FIG. 8A, and can be broken down and removed in pieces or section from a finished tire 80, as shown in FIG. 12. Such mandrel is preferably formed from sections of metal that each have appropriately curved outer and inner circumferences to fit in the mold 25 cavity 29 with all but one of the pieces or sections having a pie shape with the widest portion at what becomes the mandrel outer circumference, with a single or key piece or section formed to have a greatest width at the mandrel inner circumference and slope inwardly therefrom to a lesser width at the mandrel outer circumference. So arranged the pieces or segments are fitted and held together in side by side relationship with the single or key piece or section fitted last to the assembly, forming the donut shaped mandrel. With disassembly from a tire core package, or from a finished tire 80, involving only a removal of the single or key piece to allow removal of the other pieces or segments from a tire core package 20 interior. The metal mandrel pieces or sections are arranged to be connected together as by a clamping ring, latches, are bolted together, or the like, into a donut shape with, the releasing of such connection arrangement allows the individual pieces or sections to be removed from the tire core package or finished tire, starting with the single or key piece.

Figure 9:
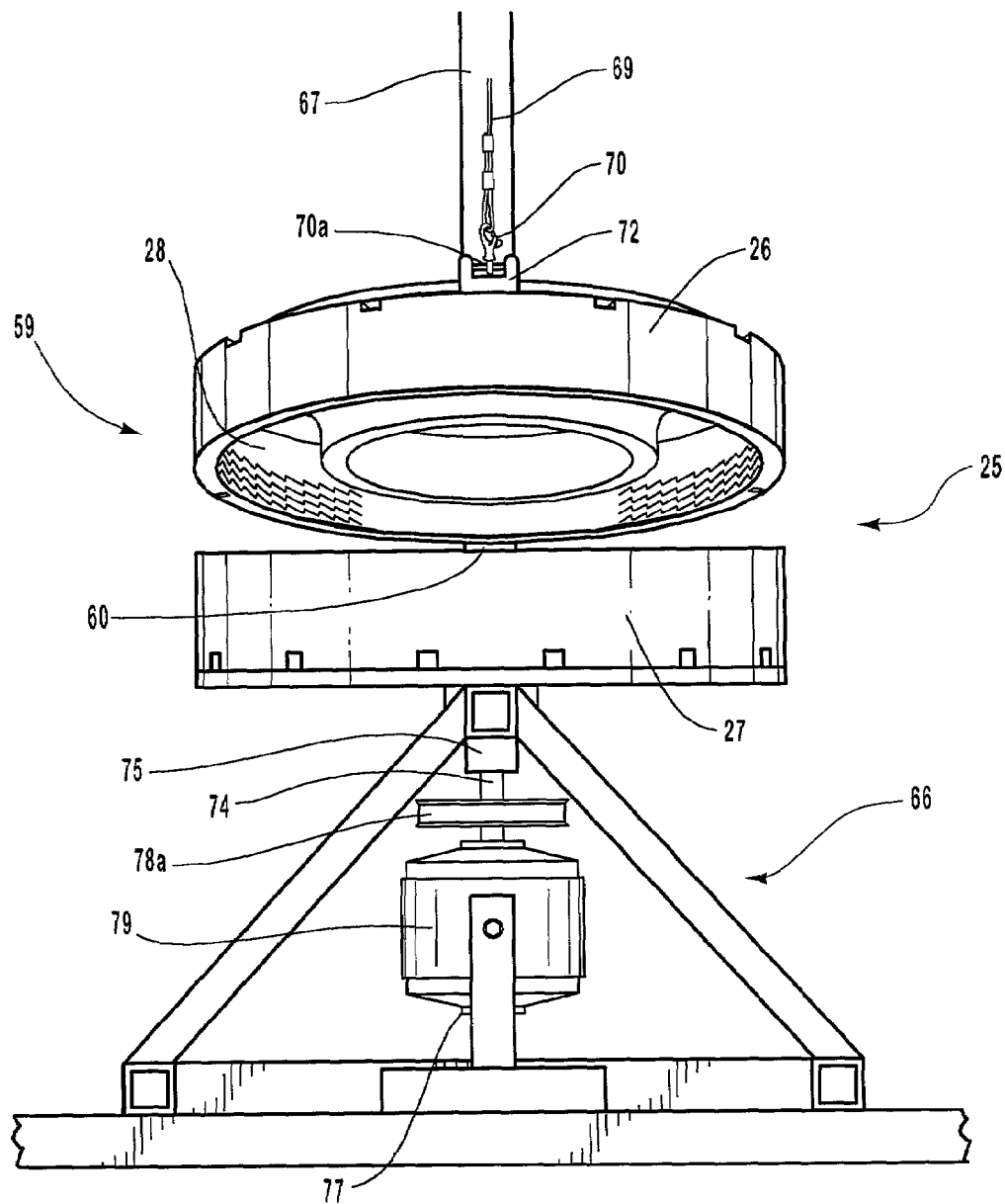
FIG. 9 shows a front end view of the of a spin casting apparatus mounting the mold halves of FIGS. 6, 7 and 8, showing the upper mold upper half suspended on a cable to be pivoted onto the lower mold half that is supported on a stand.

It should be understood that the invention is in the arrangement of a package of belts, plies and beads formed for positioning in a mold to receive an elastomer cast or molded around the tire core package 20 inner cavity 23 that will cover the beads 19, with the package inner area 23 constituting a finished tire inner surface. As an example of apparatus to provide which tire casting, FIG. 9 shows a casting apparatus 59 that includes the upper and lower mold halves 26 and 27, respectively, of mold 25. The mold halves are hinged at 60 for containing the tire core package 20 of belts, plies and beads, and a like spin cast apparatus is shown in U.S. Pat. No. 5,906,836, that one of the present inventors is co-inventor of. In practice, the tire core package 20 is position and maintained between the closed upper and lower mold halves 26 and 27 inner surfaces 28 and 29, respectively, and the elastomer is sprayed therein through nozzles 61 and 62 as the mold 25 is spun up. In the spraying the elastomer constituents flow around the package 20 outer surface to the tire beads and is blocked, as set out below, from entering the tire core package interior 23.

Figure 10:
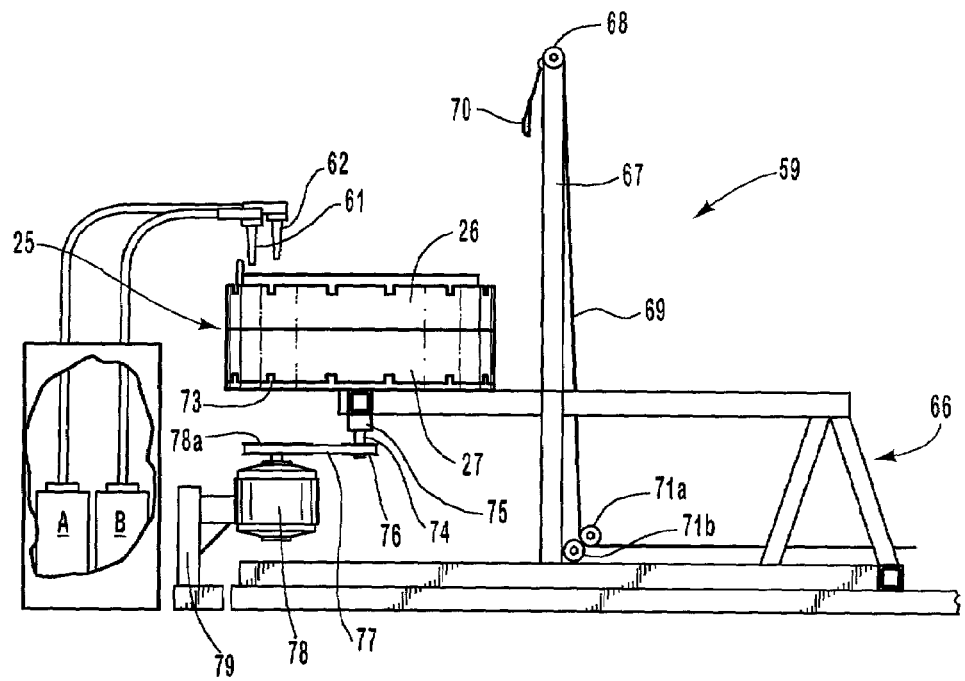
FIG. 10 shows a side elevation view of the apparatus of FIG. 9 with the upper mold half shown as having been lowered onto the lower mold half and showing an elastomer injection nozzles connected by separate hoses to container is identified as A and B that have been lowered into position to spray the materials from containers A and B into a trough of the spin casting apparatus.
Figure 11:
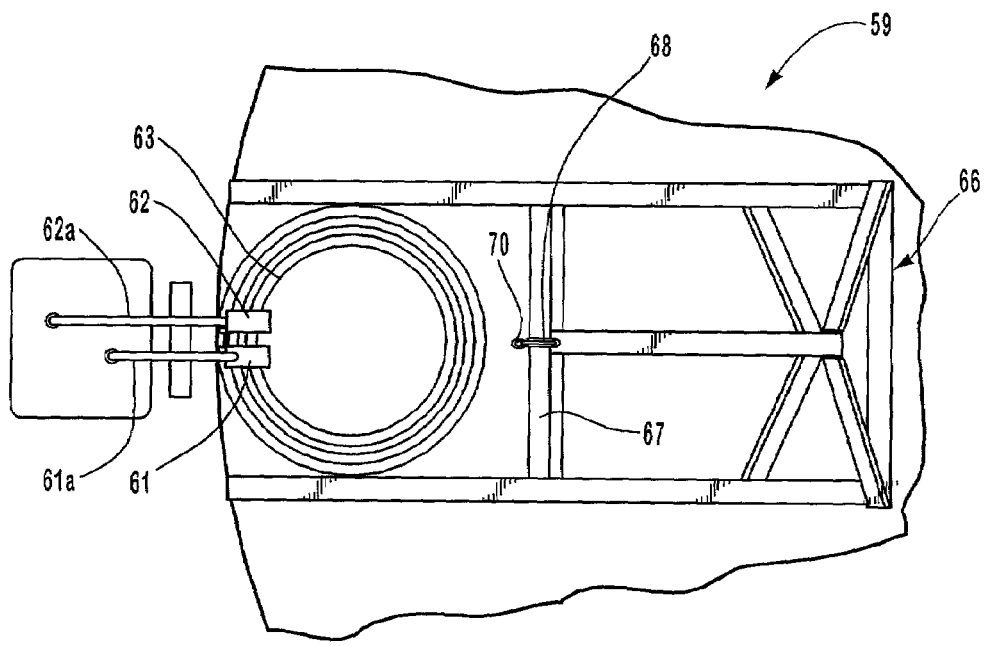
FIG. 11 shows a top plan view of the apparatus of FIG. 10 showing the nozzles aligned to spray the materials from containers A and B into the top mold half trough that vents into the mold cavity containing the core package suspended therein.

The casting apparatus 59, shown in FIGS. 9, 10 and 11, incorporates the described mold halves 26 and 27, and is preferably a spin casting apparatus like that shown in U.S. Pat. No. 5,906,836, as set out above. With the mold 25 halves closed together, as shown in FIGS. 10 and 11, is spun up as the nozzles 61 and 62 spray together to mix the elastomer constituents in a trough 63, as shown in FIG. 11, and in FIGS. 6A, 7A and 8A. The trough 63 is shown as ported at 64 and 65 to pass the mixed elastomer constituents evenly around the and into the coupled mold halves. Thereby, the mixed elastomer flows into the mold halves cavities 28 and 29 cavities wherein the package 20 is positioned, distributing the elastomer evenly therearound as the mold is spinning. The elastomer constituents, as set out above, are preferably a liquid isocyanate and a liquid poly, respectively, that are selected to form, when they are combined and cured, an elastomer having a desired hardness or derometer for an automobile or like tire. The elastomer constituents are further selected to, when mixed, produce heat through an exothermic heat of reaction that is sufficient to cure a pre-cure elastomer, as described above.

As an example only of a spin casting apparatus that the invention can be used with, FIGS. 9 through 11 show casting apparatus 59 as including a frame 66 having a vertical mast 67 that, as shown in FIGS. 10 and 11, mounts a pulley 68 across its top end that a cable 69 is strung over. Which cable 69 has a hook 70 secured to one end and is passed through opposing pulleys 71a and 71b. The hook 70, shown in FIG. 9, is for releaseably fitting under a bar 70a that is mounted across a channel 72 to pivot the upper mold half 26 upwardly, around the pivot 60, when the cable is pulled through the opposing pulleys 71a and 71b. Which hook is released from the upper mold half 26, as shown in FIGS. 10 and 11, prior to mold 25 spinning.

To provide mold spinning, the mold 25, shown in FIG. 10, is positioned onto a plate 73 that has an axle 74 extending from the center of the undersurface thereof that is journaled through a pivot mount 75 and has a gear 76 splined onto its lower end. The gear 76 connects through a chain 77 to a drive gear 78a of a motor 78 that is mounted through arm 79 to frame 66. So arranged, with the tire core package mounted in the mold 25, as described above, as shown in FIG. 10, at passage from tanks A and B of the elastomer constituents though lines 61a and 62a, respectively, to spray out of nozzles 61 and 62 into trough 63, with the motor 78 turned to and spin up the mold 25. The elastomer thereby flows into the trough 63 and out through the ports 64 and 65 into the mold 25 cavity to evenly flow around the tire core package outer surface, and complete the elastomer cure, forming tire 80 that contains the tire core package 20. .

The invention, as described in detail above, is in a formation of a tire core package where tire belts, plies and beads are positioned and maintained in a stable matrix for subsequent fitting and positioning into a mold that an elastomer is directed into, flowing around and encapsulating the package outer surface containing the tire belts, plies and beads, forming a finished tire 80.

While preferred embodiments of our invention in a tire core package and processes and materials for its manufacture, have been shown and described herein, it should be understood that variations and changes are possible to the described tire core matrix and the processes and materials suitable for use in its manufacture without departing from the subject matter coming within the scope of the following claims, and a reasonable equivalency thereof, which claims we regard as our invention.

We claim:

1. A process for encapsulating a package of plies and beads with, as required, a belt or belts within an elastomeric tire as a tire core package in a tire casting process comprising, with a pre-cure elastomer having a stiffness that allows it to be rolled into and hold a curved shape that will cure when subjected to a heat of reaction provided by a mixing of elastomeric materials in a spin casting process, forming said pre-cure elastomer into thin flat sections; intradigitating layers of said pre-cure elastomer sections with sections of fabric material that have been laid up such that the material fibers are at desired crossing angles to each other, forming a sandwich of alternating layers of pre-cure elastomer and sections of fabric as a plies; cold rolling said sandwich into a tire core shape with ends of said sandwich each folded around, to encapsulate each inelastic beads; filling and supporting said tire core package in a mold with said tire core package side walls equidistant from opposing walls of said mold; and mixing and injecting a liquid elastomeric material into said mold that is spinning, with a heat of reaction generated by mixing of constituents of said elastomeric material curing said pre-cure elastomer providing bonding to said plies and beads and with the injected elastomeric material.

2. The process as recited in claim 1, further including, in the formation of the tire core package, fitting a continuous inelastic belt around an outer surface of said tire core package; applying a layer of a pre-cure elastomer thereover; cold rolling the applied layer of pre-cure elastomer into the pores of said inelastic belt.

3. The process as recited in claim 1, further including passing air, under pressure, into the tire core package after it is positioned in the mold, with said tire core package extending from an outer surface of an annular portion of said mold, providing an equal spacing distance of said tire core package side walls and top from cavity walls of said mold.

4. The process as recited in claim 3, wherein air is passed into said tire core package through a valve stem that is fitted through a hoop that spans the tire core package bead ends and is upturned and curves outwardly at its ends where each end will fit within said tire core package to extend partially over a tire core package beads end; and said hoop is maintained around the inner annular portion when said mold is closed, containing air under pressure in said tire core package.

5. The process as recited in claim 4, further including stand-offs that are formed as short cylinders, from a pre-cured elastomer and are positioned in the mold at spaced intervals around a lower mold half inner cavity to support the tire core package side wall when that side wall is positioned in said lower mold half inner cavity.

6. The process as recited in claim 1, wherein a tubular bladder is fitted into the tire core package, and the tubular bladder is maintained in the mold cavity annular portion such that, when said bladder is pressurized, it will support said tire core package positioned in said mold, maintaining said tire core package sides at equal distances from the mold cavity sides.

7. The process as recited in claim 6, further including stand-offs formed as short cylinders from a pre-cured elastomer that are positioned in the mold at spaced intervals around a lower mold half prior to mold closure to support the tire core package at its side walls in said lower hold half cavity.

8. The process as recited in claim 1, where the mold includes upper and lower halves that are hinge connected to open in a clam shell fashion as components of a spin casting apparatus where the mold is spun at passage of the mix elastomeric material constituents into, so as to distribute them uniformly throughout the mold cavity, and the exothermic heat as is created by the mixing of said elastomer material constituents provides for a final curing of the pre-cure elastomer.

* * * * *